United States Patent [19]
Zhuk et al.

[11] 3,741,161
[45] June 26, 1973

[54] MILKING APPARATUS FOR MILKING LACTIFEROUS ANIMALS

[76] Inventors: Zinovy Yakovlevich Zhuk, Parkovaya ulitsa, korpus 1, kv. 50; Genrikh Vladimirovich Baskakov, Angarskaja ulitsa, 49, korpus 3, kv. 88, both of Moscow, U.S.S.R.

[22] Filed: June 3, 1971

[21] Appl. No.: 149,586

Related U.S. Application Data

[63] Continuation-in-part of Ser. No. 805,657, March 10, 1969, abandoned.

[52] U.S. Cl.......... 119/14.36, 119/14.41, 119/14.55
[51] Int. Cl. .............................................. A01j 5/10
[58] Field of Search...................... 119/14.36, 14.37, 119/14.54, 14.55, 14.41

[56] References Cited
UNITED STATES PATENTS

| | | | |
|---|---|---|---|
| 2,896,573 | 7/1959 | Schalm et al. | 119/14.36 |
| 1,195,996 | 8/1916 | Leitch | 119/14.37 X |
| 3,139,856 | 7/1964 | Lippke | 119/14.36 |

*Primary Examiner*—Hugh R. Chamblee
*Attorney*—Waters, Roditi, Schwartz & Nissen

[57] ABSTRACT

A milker for lactiferous animals particularly in situations where the milk is to be transported a considerable distance or against a considerably hudraulic head in which a variable vacuum chamber is connected to a pulsator for causing pressure variations, a constant vacuum chamber is connected to means for producing a vacuum, a flexible diaphragm separates the variable vacuum chamber from the constant vacuum chamber, and an annular partition provides a passage between the constant vacuum chamber and a milk receiving space. The partition is to constructed that the flexible diaphragm functions as a valve against an upstanding flange or lip of the partition when the vacuum in the variable vacuum chamber is reduced, and the diaphragm also carries a passage means for admitting of air defining a movable valve element for connecting the milk receiving space to exterior ambient atmospheric pressure when the diaphragm functions as a valve against the partition.

4 Claims, 3 Drawing Figures

MILKING APPARATUS FOR MILKING LACTIFEROUS ANIMALS

BACKGROUND OF THE INVENTION

This present application is a continuation-in-part of our co-pending application Ser. No. 805,657 filed March 10, 1969, now abandoned.

The present invention relates to milking apparatus for milking lactiferous animals.

Milkers for milking lactiferous animals for far known in the art consists of a collector, which comprises a variable vacuum chamber connected to a pulsator, and to the variable vacuum chambers of teat cups, and a milk collecting chamber communicating with the test chambers of the cups, and with the milk collector.

Such types of milking apparatus have a common disadvantage in that, depending upon the rate of milk drawing and the type of milking plant used, the length and design of the vacuum pipes, the vacuum value in the teat chambers of the cups substantially differs in the course of milking from that preset in the milk collector and the milk line.

Numerous investigations have proved that a suction pressure of 380–400 mm Hg constitutes the optimum value thereof. Greater vacuum, though increasing the rate of milking, causes a disease of the animal's udder, whereas less vacuum results in a longer duration of the milking process.

Also, the longer the vacuum pipes, the greater is the drop inn the suction pressure of the teat chambers of the cups, which is due to the drop of vacuum in the course of milk transportation from the teats.

Particularly great is the drop in suction pressure, when milking is accompanied by delivery of milk into a milk line disposed, as a rule, at a height of 2 m above the floor level. In such plants, due to the comparatively great height of milk delivery, the suction pressure in the teat chambers can drop down to 230 mm of Hg.

The object of the invention is to provide a milking apparatus, that can ensure effective milking by milkers of different types without any harm to the animal's health.

SUMMARY OF THE INVENTION

The milking apparatus has a collector consisting of a variable vacuum chamber, a constant vacuum chamber, and a chamber for collecting the milk coming from the teat cups, with the collecting chamber communicating during the suction stroke with the constant vacuum chamber, and during the relief (compression) stroke separating therefrom, and having a valve to admit air into the chamber for collecting milk at the moment the latter is discharged from this chamber to the milk line (milk collector).

One of the modifications of the invention includes a pipe pressed into the central portion of an elastic partition. This pipe regularly communicates through its upper end with ambient air, and in its extreme upper position it is closed by a plug mounted over the variable vacuum chamber, and is used as a valve for admitting air into this chamber.

Other objects and advantages of the present invention will be apparent from the description of its particular embodiment.

Following is a detailed description of an exemplary embodiment of the present invention with references to the accompanying drawings, in which:

DETAILED DESCRIPTION OF THE INVENTION

Figure 1:
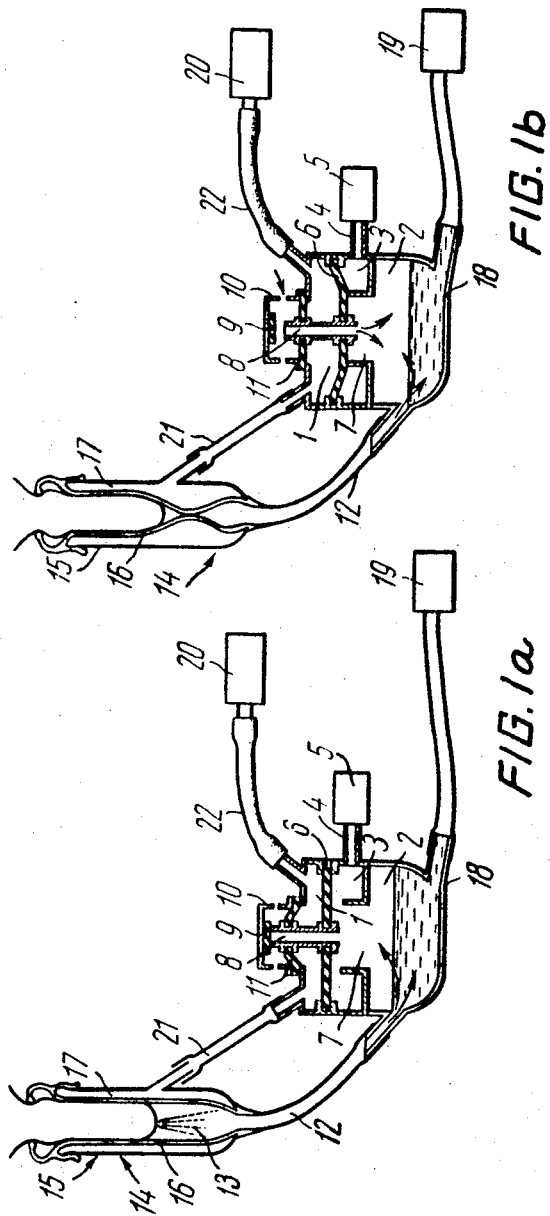
FIG. 1a is a schematic representation of the milking apparatus according to the invention during the suction stroke.
FIG. 1b is a schematic representation of the milking apparatus according to the invention during the relief stroke.
Figure 2:
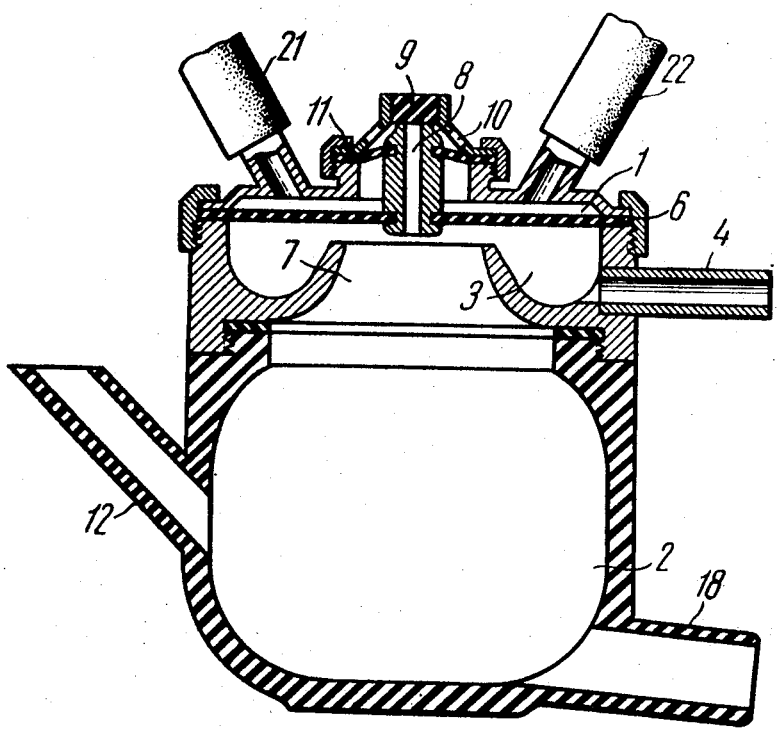
FIG. 2 is a vertical section, on an enlarged scale, of the collector of the milking apparatus according to the invention.

The collector of the milking apparatus has a variable vacuum chamber 1, a milk collecting chamber 2, and a constant vacuum chamber 3 which regularly communicates with the open upper part of the chamber 2. The constant vacuum chamber is, through a pipe 4, connected to a vacuum source 5 (FIG. 1a).

The constant vacuum chamber 3 is disposed between the chamber 2 and the variable vacuum chamber 1, and is separated from the latter by an elastic partition, or diaphragm 6, the central portion of which regularly closes a circular axial passage 7 that connects chamber 3 with the upper part of the collecting chamber 2. The passage 7 is defined by an upstanding flange or lip 7a provided on a partition wall 7b.

Attached to the central portion of the diaphragm 6 is a pipe 8 serving for regular air admission into the chamber 2. When the diaphragm 6 together with the pipe 8 is in its extreme upper position, the pipe 8 is closed by a plug 9. This plug is mounted over the variable vacuum chamber 1 by means of clamps 10. The plug 9 constitutes the seat of a valve that closes the access of air into the pipe 8 in its uppermost position.

The variable vacuum chamber 1 is restricted from the top and bottom by flexible partitions (diaphragms), namely by the lower diaphragm 6 and an upper sealing partition 11. The upper partition 11 of the variable vacuum chamber also serves as a guide for the pipe 8, and is made flexible, so as not to hinder the movements of this pipe together with the diaphragm 6.

The chamber 2 of the collector through hoses 12 communicates with teat chambers 13 of the teat cups 14.

The teat cup comprises a sleeve 15 and a rubber pipe 16 placed on the animal's teat. The rubber pipes 16 together with sleeves 15 form, in turn, variable vacuum chambers 17 of the teat cups 14. Milk from the chamber 2 is sucked, during the relief stroke, into a milk collector 19 through a pipe 18.

The variable vacuum chamber 1 is connected to the teat cup chambers 17 and to a pulsator 20 by hoses 21 and 22, respectively. The pulsator 20 is connected to a vacuum pump (not shown), and is essentially a switch for periodic switching between a reduced pressure and atmospheric pressure.

The milking apparatus functions as follows:

The pulsator 20 having first been switched on for vacuum (FIG. 1a), communicates through the hose 22 with the variable vacuum chamber 1, and through the hoses 21 with the variable vacuum chambers 17 of the teat cups 14. Hence, there is vacuum in both the variable and constant vacuum chambers of the teat cups. The flexible partition or diaphragm 6 with the metal pipe 8 is in its uppermost position when pulsator 20 communicates the vacuum, and the chamber 3 of constant vacuum produced through the pipe 4, is connected with the chamber 2 by way of the axial passage 7. At this moment, milk is being sucked and accumulates in the chamber 2. The size of the chamber 2 is chosen so as to collect all the milk produced within one milking cycle (one suction stroke), i.e. about 100–120 cm$^3$. At this stage, milk is not discharged from the chamber 2 via the pipe 18, since the vacuum in the pipe 18 and in the chambers 3, 2, and the pipe 4, i.e. over the milk column, is kept at the same level. (Usually the vacuum in the pipe 4 is ever greater, than in the pipe 18).

When air is supplied from the pulsator 20 into the variable vacuum chamber 1 (FIG. 1b), it is also supplied into the variable vacuum chambers of the teat cups. The flexible partition 6 disposed between chambers 1 and 3 of variable and constant vacuum will sink under the action of air, with its central portion closing the axial passage 7 which connects the chamber 3 with the top part of the chamber 2, so that the metal pipe 8 in the central portion of the partition, or diaphragm 6 will separate from the plug 9, thus letting in air, as a result of which the chamber 2 will be filled with this air at atmospheric pressure.

This accelerates the process of discharging milk from the chamber 2, with the amount and velocity of air entering the chamber 2 being determined by the sectional area of the pipe 8. The milking apparatus designed according to the above description is capable of both double- and three-cycle operation. To provide a milker with a three-cycle action, the bore of the metal pipe 8 is made wider, and thus the stroke of the animal's teats compression is followed by a rest stroke, owing to the fact that atmospheric air from the collecting chamber 2 is let into the teat chamber 13 to relieve the animal's udder for a certain period of time from the effect of the vacuum.

What we claim is:

1. A milking apparatus for milking lactiferous animals, comprising teat cups each provided with means defining a teat chamber and a variable vacuum chamber; a collector provided with means defining a milk collecting chamber, said milk collecting chamber being provided with an open upper part in communication with the teat chambers of said teat cups; means defining a variable vacuum chamber in said collector, flexible hoses connecting said collector variable vacuum chamber with the variable vacuum chambers of said teat cups; a pulsator connected to the variable vacuum chamber of the collector; means defining a constant vacuum chamber in said collector, said constant vacuum chamber defining means having a central passage that adjoins an open top of said milk collecting chamber; a valve means disposed in an upper part of said collector, and serving to admit air into said milk collecting chamber in a timed relationship with pulsations in the variable vacuum chamber of said collector; and means communicating with the milk collecting chamber through which milk is discharged.

2. The apparatus as in claim 1, wherein the constant vacuum chamber of the collector is disposed between the milk collecting chamber and the variable vacuum chamber of the collector.

3. The apparatus as in claim 1, wherein the valve means comprises a diaphragm disposed between the variable vacuum chamber of said collector and the constant vacuum chamber of said collector, and said diaphragm having a central portion which regularly blocks the edges of the central passage connecting the constant vacuum chamber with the open top of the milk collecting chamber.

4. The milking apparatus as in claim 3, wherein the valve means comprises a pipe having upper and lower ends, said pipe being attached to the central portion of the diaphragm, and regularly communicating through its upper end with ambient air, and a plug to close the upper end of the pipe in order to disconnect it from ambient air, with said plug being mounted on an outer surface of the means forming the variable vacuum chamber of the collector.

* * * * *